United States Patent [19]

Woesler

[11] 4,380,324
[45] Apr. 19, 1983

[54] SUPPORT MEMBER FOR AN EXHAUST PIPE OF A MOTOR VEHICLE

[75] Inventor: Ehrenfried Woesler, Rosrath, Fed. Rep. of Germany

[73] Assignee: Ford Motor Company, Dearborn, Mich.

[21] Appl. No.: 304,472

[22] Filed: Sep. 22, 1981

[30] Foreign Application Priority Data

Dec. 9, 1980 [DE] Fed. Rep. of Germany ....... 3034370

[51] Int. Cl.³ ............................................. F16M 13/00
[52] U.S. Cl. ..................................... 248/610; 248/317
[58] Field of Search ............... 248/610, 611, 612, 568, 248/58, 60; 248/316 E, 317

[56] References Cited

U.S. PATENT DOCUMENTS

| 562,566 | 6/1896 | Baynes | 248/317 |
|---|---|---|---|
| 1,420,654 | 6/1922 | Grant | 248/317 |
| 1,888,704 | 11/1932 | Swett | 248/317 |
| 2,744,715 | 5/1956 | Charat | 248/317 |
| 2,751,178 | 6/1956 | Knecht | 248/317 |

FOREIGN PATENT DOCUMENTS 131845  1/1978  Fed. Rep. of Germany ...... 248/610

Primary Examiner—William H. Schultz
Assistant Examiner—Ramón O. Ramirez
Attorney, Agent, or Firm—Robert E. McCollum; Clifford L. Sadler

[57] ABSTRACT

A one-piece elastic support having an outer loop-like main body portion secured to the vehicle body with a tether or strap projecting in a cantilever manner from the loop into the central opening for supporting a portion of the exhaust system from the lower end of the strap, the lower end of the strap having a tab or cam that projects beyond the lower end of the loop for contact with it to prevent undue deflection of the strap, the engagement of the tab effecting a stiffer or more rigid suspension thereafter.

5 Claims, 3 Drawing Figures

SUPPORT MEMBER FOR AN EXHAUST PIPE OF A MOTOR VEHICLE

This invention relates in general to a support member for an exhaust pipe of a motor vehicle. More particularly, it relates to a one-piece flexible member that provides two degrees of elasticity, a first soft support during the initial support operation, followed by a harder or less elastic support during a second stage of operation.

This invention is an improvement on the suspension device shown in German patent DE-AS No. 26 58 358. The latter shows and describes a sling or loop-shaped suspension body made of elastic material and having central bars or straps and an elastically deformable tension-proof core or frame surrounding the support loop. The support parts are located directly in openings in the upper and lower areas of the support loop and provide a suspension of the exhaust system with an initially relatively soft suspension characteristic or deflection for the attainment of good vibration insulation and in case of excessive movement of the exhaust system, to provide good stability under shock loads by means of a progressive suspension.

The suspension system of the prior art has the disadvantage that it is relatively expensive to manufacture because of the embedding therein of the pliable tension-resistant core, for example, the spring steel strip. The tension-resistant core, because of the low rubber elasticity in the area of the mounting pickup hooks, can be considered a body sound bridge especially above, but also under, 200 Hz, whereby the desired isolation is prevented.

A primary object of the present invention is to provide a suspension device of the type mentioned above with the desired characteristics of a first linearly soft and subsequently progressively stiffer spring deflection, and one whose manufacture is considerably less expensive and simpler and whose sound proofing is better than that of the known type.

The above object is accomplished in the following manner. The support part mounted on the vehicle structure is carried in an opening in the upper area of a loop-shaped suspension body, while the support part attached to the exhaust system is carried in a free-standing, vertical strap or tether of the suspension body that is fitted on its outer contour with at least one tab or cam which, in case of excessive movement of the exhaust system, causes the strap to engage the lower portion of the retaining support ring; the initially linear soft spring deflection being attained through the soft form of the strap, while the progressively more rigid spring deflection is obtained upon the tab contacting the enveloping support ring. By the arrangement of one or more tabs or cams in the outer contour of the lower part of the strap, excessive movements of the exhaust system in various directions can be adjusted accordingly and can be absorbed.

The elasticity of the free-standing, vertical strap or tether and the support ring enveloping it can be attained by shaping of a uniform elastic material, or through elastic materials of different elasticity in the various areas, whereby by eliminating the tension-resistant core or frame of the prior art, optimum sound proofing can be attained. Because of the relatively large rubber volume in the area of the supporting part, exhaust resonances are better damped in the area below 60 Hz.

The suspension device according to the invention also has the additional advantage that, if the strap providing for the soft spring deflection should break, the support ring surrounding the strap continues to maintain the retaining function for the exhaust system.

Other objects, features and advantages of the invention will become more apparent upon reference to the succeeding detailed description thereof and to the drawings illustrating the preferred embodiment thereof; wherein.

Figure 1:
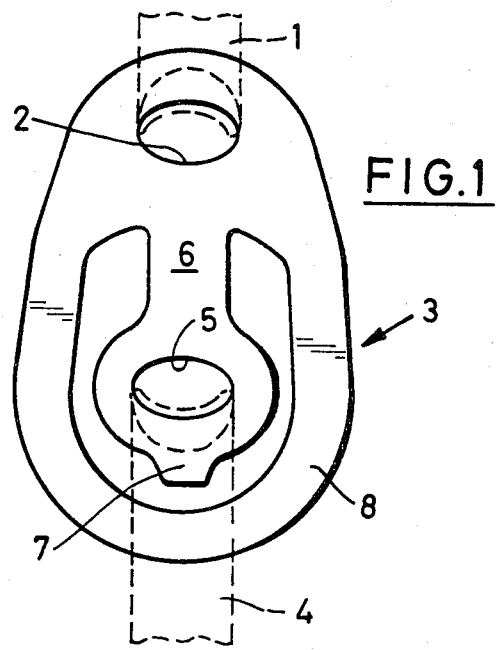
FIG. 1 is an elevational view of a support member embodying the invention.

In FIG. 1, the dotted lines represent a supporting part 1 attached to the motor vehicle structure that is inserted in an opening 2 in the upper part of the loop-shaped suspension body 3. The dotted lines also show a part 4 of the exhaust system carried in an opening 5 in a free-standing, vertical strap or tether 6 of the suspension body 3. The free-standing, vertical strap 6 is equipped on its lower contour with at least one tab or cam 7, which in an excessive movement of the exhaust system causes this strap 6 to come in contact with the lower part of the retaining support ring 8.

The free-standing vertical strap 6 is shaped in such a way that it has relatively soft suspension characteristics, as is desirable for the normal operation of the motor vehicle for the attainment of a good vibration insulation. The support ring 8 enveloping the free-standing, vertical strap 6 is shaped so that it has progressively stiffer suspension characteristics, in order to be able to better absorb the load change reactions in acceleration and braking maneuvers occurring especially in vehicles with a transverse mounted front engine. The arrangement of the tab or cam 7 in the above construction on the lower end of the outer contour of strap 6 indicates that these load change reactions are directed downwards.

Depending upon the placement of the suspension device for the exhaust system in the vehicle, this arrangement can have one or more tabs or cams on the outer contour of the lower end of the free-standing, vertical strap corresponding to the various directions in which the load change reactions anticipated.

Figure 2:
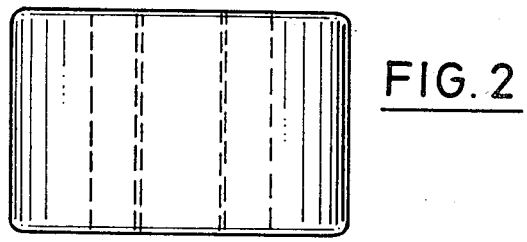
FIG. 2 is a plan view of the support member of FIG. 1.

FIG. 2 shows that the suspension body 3 permits a simple and inexpensive manufacture made of elastic material.

Figure 3:
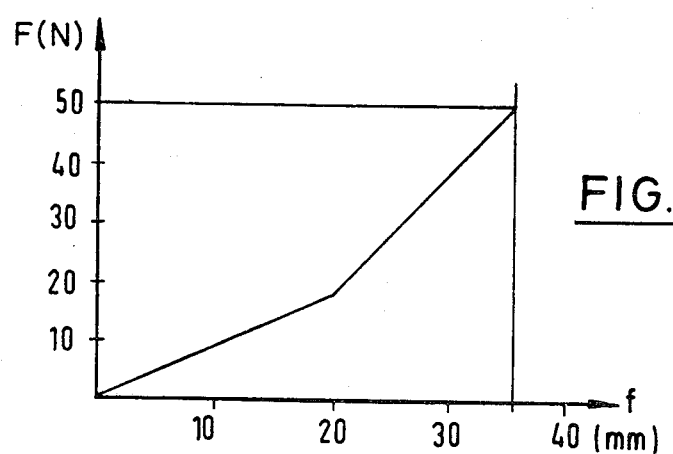
FIG. 3 is a diagram of the spring deflection characteristics of the support member of FIGS. 1 and 2.

FIG. 3 shows a diagram of the suspension characteristics that can be attained with a suspension as per FIGS. 1 and 2.

It will be clear from the above that the invention provides an one-piece elastic support having an outer loop-like main body portion secured to the vehicle body with a tether or strap projecting in a cantilever manner from the loop into the central opening for supporting a portion of the exhaust system from the lower end of the strap, the lower end of the strap having a tab or cam that projects beyond the lower end of the loop for contact with it to prevent undue deflection of the strap, the engagement of the tab effecting a stiffer or more rigid suspension thereafter.

While the invention has been shown and described in its preferred embodiment, it will be clear to those skilled in the arts to which it pertains that many changes and modifications may be made thereto without departing from the scope of the invention.

I claim:

1. A suspension device for an exhaust pipe of a motor vehicle comprising a one-piece flexible mounting support member having a loop type body portion with a central opening, an elastic tether portion depending in a cantilever manner from the body portion into the central opening for a swinging movement with respect to the body portion, the body portion having a hole therein at one end adapted to receive a vehicle support member therethrough, and the tether portion having a hole therein adapted to receive therethrough a portion of the exhaust pipe to provide an elastically soft suspension of the exhaust pipe from the vehicle, the tether portion being freely swingible through the central opening in either direction, and including a protuberance extending from one end a distance sufficient to overlap the body portion during swinging movement of the tether portion in one direction to thereby engage the tether portion against the body portion to resist further swinging movement of the tether portion in the one direction.

2. A device as in claim 1, wherein the body portion is less elastic than the tether portion providing a first soft linear rate of suspension of the exhaust pipe from the free-standing tether and a second harder linear rate of suspension upon engagement of the protruding portion of the tether portion with the body portion.

3. A device as in claim 1, the body portion and tether portion being one continuous homogeneous member of a rubber-like consistency providing elasticity to all portions of the member.

4. A device as in claim 1, the flexible member depending from the vehicle support in an essentially vertical manner, the tether portion constituting a tongue-like strap depending freely downwardly from the body portion towards but spaced from the lower end of the loop-like body portion, the protuberance constituting an abutment-like tab engaging the lower end of the body portion and preventing swinging movement of the strap past the body portion and through the central opening.

5. A device as in claim 2, the body portion being constructed with reinforcement means therein providing less elasticity to the body portion than the tether portion.

* * * * *